US011367358B1

(12) United States Patent
Vemuri et al.

(10) Patent No.: US 11,367,358 B1
(45) Date of Patent: Jun. 21, 2022

(54) METHOD OF ARRANGING PLATOONING VEHICLES BASED ON VEHICLES' HISTORIC WIRELESS PERFORMANCE

(71) Applicant: GM Global Technology Operations LLC, Detroit, MI (US)

(72) Inventors: Venkata Naga Siva Vikas Vemuri, Novi, MI (US); Andrew J. MacDonald, Grosse Point Park, MI (US); Scott T. Droste, West Bloomfield, MI (US); Charles A. Everhart, Canton, MI (US); Ashhad Mohammed, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 11 days.

(21) Appl. No.: 17/178,863

(22) Filed: Feb. 18, 2021

(51) Int. Cl.
*G08G 1/00* (2006.01)
*H04W 4/46* (2018.01)

(52) U.S. Cl.
CPC .............. *G08G 1/22* (2013.01); *G08G 1/20* (2013.01); *H04W 4/46* (2018.02)

(58) Field of Classification Search
CPC .............. G08G 1/22; G08G 1/20; H04W 4/46
See application file for complete search history.

(56) References Cited

U.S. PATENT DOCUMENTS

| 6,032,097 | A | 2/2000 | Iihoshi et al. |
| 10,068,485 | B2 | 9/2018 | Dudar |
| 2019/0066406 | A1 | 2/2019 | Sarwar et al. |
| 2019/0250639 | A1* | 8/2019 | Xu ..................... G08G 1/0133 |
| 2020/0118445 | A1* | 4/2020 | Kim ..................... H04W 4/06 |
| 2020/0241563 | A1 | 7/2020 | Van Der Knaap et al. |
| 2020/0264634 | A1* | 8/2020 | Hadi ................. B60W 60/0023 |
| 2022/0108618 | A1* | 4/2022 | Kumar ................... H04W 4/40 |

FOREIGN PATENT DOCUMENTS

DE 102020006702 * 2/2021 ............... G08G 1/22

* cited by examiner

*Primary Examiner* — Hongmin Fan
(74) *Attorney, Agent, or Firm* — Vivacqua Crane PLLC

(57) ABSTRACT

A method of arranging platooning vehicles based on the vehicles' historic wireless performance. The method includes a requesting vehicle requesting permission from a lead vehicle of a platoon to join the platoon. The lead vehicle determines if the Advance Driver Assisted Systems (ADAS) Instance State-of-Health (SOH) Scores are above a predetermined minimal threshold and if so, then whether the Overall Historic ADAS SOH Score contains one or more discrepancies. If the Overall Historic ADAS SOH Score contains no discrepancies, the lead vehicle than analyzes the historic wireless performance data from the requesting vehicle and determines a historic wireless performance (WP) score for the requesting vehicle. The requesting vehicle is then arranged in the platoon based on the relative historic WP score of the requesting vehicle to the WP score of the platooning vehicles.

20 Claims, 7 Drawing Sheets

| Vehicle Information | Number of instances | No. of instances above minimum performance threshold value | Threshold min value based on 4G as an example |
|---|---|---|---|
| Number of Platooning Engagements | X=100 | N/A | N/A |
| Time Duration in Platooning Engagements | Y hours= 10 hours | N/A | N/A |
| RSSI* | 100 engagements | 75 times | -105 dBm |
| Packet Delivery Ratio* | 100 engagements | 95 times | 90% |
| Signal to Interference Noise Ratio* | 100 engagements | 90 times | 7 dB |
| Bit Error Rate* | 100 engagements | 85 times | 10^-2 |
| Latency* | 100 engagements | 80 times | 10ms or less |

FIG. 5

| | E | F | G | H | I | J | K |
|---|---|---|---|---|---|---|---|
| | Criteria | Weight | Joining Vehicle | Platooning Vehicle 1 | Platooning Vehicle 2 | ......... | Platooning Vehicle N |
| | Number of Platooning Engagements | N/A | N/A | N/A | N/A | N/A | N/A |
| | Time Duration in Platooning Engagements | N/A | N/A | N/A | N/A | | N/A |
| | RSSI* | 5 | 3.75 | 5 | 4 | | 2.5 |
| | Packet Delivery Ratio* | 2 | 1.9 | 1.95 | 2 | | 1.5 |
| | Signal to Interference Noise Ratio* | 2 | 1.8 | 2 | 1.5 | | 1.5 |
| | Bit Error Rate* | 2 | 1.7 | 1.8 | 1.6 | | 1 |
| | Latency* | 5 | 4 | 4.5 | 4 | | 3 |
| L → | Total= Final Decision Score | Total | 13.15 | 15.25 | 13.1 | | 9.5 |

FIG. 6

METHOD OF ARRANGING PLATOONING VEHICLES BASED ON VEHICLES' HISTORIC WIRELESS PERFORMANCE

INTRODUCTION

The present disclosure relates to a method of arranging platooning vehicles, more particularly to a method of arranging platooning vehicles based on the vehicles' wireless performance scores.

Vehicles equipped with Advance Driver Assisted Systems (ADAS) can be enabled to connect and exchange information with other ADAS equipped vehicles to allow for the coordinated movements between such vehicles. One example of such coordinated movements is a platooning of a group of ADAS equipped vehicles. Platooning of vehicles involves a lead vehicle and one or more follow vehicles traveling closely together, typically maintaining a distance of about 10 to 40 feet between adjacent vehicles, in a single-file line in a same direction. Vehicles platooning improves the aerodynamic effectiveness and performance of the moving vehicles, thereby increases the capacity of roads and provides a more steady-state traffic flow.

For an ADAS equipped vehicle to participate in a platoon, an onboard controller, which may be part of the ADAS, is connected to a vehicle-to-vehicle (V2V) communications system that receives and transmits data using Dedicated Short-Range Communications (DSC). The lead vehicle may communicate with the other vehicles in the platoon using the V2V communications system. Also, each of the vehicles in the platoon may communicate with the other vehicles in the platoon using the V2V communications system. The lead vehicle controls the speed and direction, and all follow vehicles respond to the lead vehicle's movement and/or instructions by precisely matching steering, braking, and acceleration of the lead vehicle in the same direction of travel. The lead vehicle may be controlled by a human operator, partially assisted by the ADAS, or fully controlled by the ADAS. The follow vehicles in the platoon may operate in a partially autonomous mode or a full autonomous mode in following the lead vehicle.

While the vehicles are platooning, it is routine that participating vehicles exit the platoon and other vehicles join the platoon. The other vehicles that join the platoon are referred to as new vehicles. Participating vehicles includes the lead vehicle, the last follow vehicle, and any follow vehicles therebetween. When a participating vehicle exits the platoon, the vacated vehicle slot that is left by the exiting vehicle is quickly closed by the follow vehicle immediately behind the exiting vehicle to maintain a tight line of platooning vehicles. When a new vehicle joins the platoon, the new vehicle typically joins the end of the column of platooning vehicles, thereby becoming the end vehicle in the platoon.

Thus, while the currently methods of operating and arranging ADAS equipped vehicles in a platoon achieve their intended purpose, there is a continual need for more efficient methods of operating and arranging platooning vehicles.

SUMMARY

According to several aspects, a method of arranging a requesting vehicle in a platoon is provided. The method includes receiving a request to join the platoon from a requesting vehicle; requesting and receiving a historic Advance Driver Assisted System (ADAS) data from requesting vehicle; analyzing the historic ADAS data to determine a plurality of last ADAS Instance State-of-Health (SHO) Scores; determining if the plurality of last ADAS Instance SHO Scores are above a predetermined minimal ADAS Instance SHO threshold; and denying requesting vehicle permission to join the platoon, when at least one of the plurality of last ADAS Instance SHO Scores are not above the minimal ADAS Instance SHO threshold.

In an additional aspect of the present disclosure, the method further includes analyzing the historic ADAS data to determine an Overall Historic ADAS State-of-Health (SOH) Score; determining if the Overall Historic ADAS SOH Score includes a discrepancy, when the plurality of last ADAS Instance SHO Scores are above the minimal ADAS Instance SHO threshold; and arranging the requesting vehicle to an end position in the platoon, when the Overall Historic ADAS SOH Score includes the discrepancy.

In another aspect of the present disclosure, the method further includes requesting and receiving a historic wireless performance data from the requesting vehicle and analyzing the wireless performance data to determine an Overall Wireless Performance (WP) Score of the requesting vehicle, when the Overall Historic ADAS SOH Score does not include the discrepancy; determining whether the Overall WP Score of the requesting vehicle is equal to or greater than a minimum wireless performance threshold; determining if the Overall WP Score of the requesting vehicle is equal to or less than a WP Score of a potential lead vehicle (PLV), when the Overall WP Score of the requesting vehicle is equal to or greater than a minimum wireless performance threshold; and arranging the requesting vehicle to a position behind the PLV, when the Overall WP Score of the requesting vehicle is equal to or less than the WP Score of the PLV the WP Score of the potential lead vehicle (PLV).

In another aspect of the present disclosure, the method further includes arranging the requesting vehicle to a position in front of the PLV and designate the requesting vehicle as a new PLV, when the Overall WP Score is of the requesting vehicle is greater than the WP Score of the PLV.

In another aspect of the present disclosure, the method further includes determining if the Overall WP Score is less than all the WP Scores of a plurality of follow vehicles, when the Overall WP Score of the requesting vehicle is less than the minimum wireless performance threshold; arranging the requesting vehicle in an end position of the platoon, when the Overall WP Score of the requesting vehicle is less than all the WP Scores of the plurality of follow vehicles.

In another aspect of the present disclosure, the method further includes arranging the requesting vehicle and the follow vehicles in order from high to low WP Scores with the higher WP Scores toward a front of the platoon, when the Overall WP Score of the requesting vehicle is greater than all the WP Scores of the plurality of follow vehicles.

In another aspect of the present disclosure, when the requesting vehicle and the one of the follow vehicles have an equal WP Score, the requesting and the one of the follow vehicles having a higher Overall Historic ADAS SOH Score is arranged in front of the other.

In another aspect of the present disclosure, wherein the analyzing wireless performance data to determine the Overall WP Score includes: determining a Weighted Criteria WP Score of each of a plurality of wireless criteria; and calculating the Overall WP Score by summing the Weighted Criteria WP Scores.

In another aspect of the present disclosure, wherein the Weighted Criteria WP Score is calculated by:

Weighted Criteria WP Score=(NI/TI)*Wt

Where:
NI=Number of Instances above a criteria threshold;
TI=Total number of instances of past platoon engagement; and
Wt=Weight assigned to a criteria, wherein the greater a numerical valve, the greater the importance of the criteria.

In another aspect of the present disclosure, wherein the method above is performed by a lead vehicle.

According to several aspects, a method of arranging platooning vehicles is provided. Each of the plurality of participating vehicle includes an Advance Driver Assisted System (ADAS) State-of-Health (SOH) Score and a Wireless Performance (WP) Score. The method includes requesting, by a requesting vehicle, to join a platoon having a plurality of participating vehicles; determining an ADAS SOH Score of the requesting vehicle; determining if the ADAS SOH Score of the requesting vehicle meets a minimal ADAS threshold; determining a WP Score of the requesting vehicle when the ADAS SOH score of the requesting vehicle meets the minimal ADAS threshold; and assigning a slot position within the platoon to the requesting vehicle based on a comparison of at least one of: (i) the ADAS SOH Score of the requesting vehicle and the ADAS SOH Scores participating vehicles and (ii) the WP Score of the requesting vehicle and the WP Scores of the participating vehicles.

In an additional aspect of the present disclosure, wherein determining if the ADAS SOH score of the requesting vehicle meets a predetermine threshold includes: determining if a plurality of last ADAS Instance SOH Scores of the requesting vehicle meet a predetermined minimal ADAS Instance SHO threshold; and rejecting the requesting vehicle, when the plurality of last ADAS Instance SOH Scores of the requesting vehicle does NOT meet the predetermined minimal ADAS Instance SHO threshold.

In another aspect of the present disclosure, the method further includes determining if an Overall Historic ADAS SOH Score of the requesting vehicle includes a discrepancy, when the plurality of last ADAS Instance SOH Scores of the requesting vehicle DOES meet the predetermined minimal ADAS Instance SHO threshold; and assigning an end position within the platoon for the requesting vehicle, when the Overall Historic ADAS SOH Score of the requesting vehicle DOES includes a discrepancy.

In another aspect of the present disclosure, wherein the plurality of participating vehicles includes a lead vehicle and a potential lead vehicle (PLV) immediately behind the lead vehicle. The method further includes: determining if the WP Score of the requesting vehicle is equal to or greater than a predetermined wireless performance threshold, when the Overall Historic ADAS SOH Score of the requesting vehicle does NOT includes a discrepancy; determining if the WP Score of the requesting vehicle is equal to or less than the WP Score of the PLV, when the WP Score of the requesting vehicle is equal to or greater than the predetermined wireless performance threshold; assigning the requesting vehicle as a new PLV vehicle behind the lead vehicle, when the WP Score of the requesting vehicle is NOT equal to or is less than the WP Score of the PLV.

In another aspect of the present disclosure, the method further includes determining if the WP Score of the requesting vehicle is less than all the WP Scores of the participating vehicles, when the WP Score of the requesting vehicle is NOT equal to or greater than the predetermined wireless performance threshold; and assigning an end position for the requesting vehicle, when the WP Score of the requesting vehicle is less than all the WP Scores of the participating vehicles.

According to several aspects, a method of arranging platooning vehicles based on the vehicles' historic wireless performance. The method includes requesting permission, by a requesting vehicle, from a platooning vehicle to join a platoon; requesting and receiving, by the platooning vehicle, a predetermined number of Advance Driver Assisted System (ADAS) Instance State-of-Health (SOH) Scores from the requesting vehicle; determining, by the platooning vehicle, if the predetermined number ADAS Instance SOH Scores are above a predetermined minimal ADAS Instance SHO threshold; and denying permission, by the platooning vehicle, for the requesting vehicle to join when the predetermined number ADAS Instance SOH Scores are NOT above the predetermined minimal ADAS Instance SHO threshold.

In an additional aspect of the present disclosure, the method further includes requesting and receiving, by the platooning vehicle, an Overall Historic ADAS SOH Score from the requesting vehicle; determining, by the platooning vehicle, if the Overall Historic ADAS SOH Score contains one or more discrepancies; and assigning, by the platooning vehicle, the requesting vehicle to the end of the platoon when the Overall Historic ADAS SOH Score contains one or more discrepancies.

In another aspect of the present disclosure, the method further includes requesting and receiving, by the platooning vehicle, a Historic Wireless Performance Data from the requesting vehicle; determining, by the platooning vehicle, an Overall Wireless Performance Score from the Historic Wireless Performance Data from the requesting vehicle; comparing and ranking the Overall WP Score of the requesting vehicle with an Overall WP Score of each of the platooning vehicles; and assigning a slot position, by the platooning vehicle, for the requesting vehicle base on the ranking of the Overall WP Score of the requesting vehicle.

In another aspect of the present disclosure, wherein the platooning vehicle is a lead vehicle.

In another aspect of the present disclosure, wherein predetermined number of last ADAS Instance SOH Scores is last 5 ADAS Instance SOH Scores.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a wireless matrix used to determine the vehicle's historic wireless performance; and FIG. 6 is an exemplary determination of historic wireless performances of participating vehicles in a platoon.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Platooning of vehicles involves a lead vehicle and one or more follow vehicles traveling closely together in a single-file line in a same direction. Vehicles platooning improves the aerodynamic effectiveness and performance, thereby increases the capacity of roads and provides a more steady-state traffic flow. Vehicles participating in the platoon are referred to as platooning vehicles or participating vehicles, which includes the lead vehicle, the last follow vehicle or end vehicle, and any follow vehicles therebetween.

During the course of platooning, the overall number of participating vehicles may change. Participating vehicles may leave the platoon and other vehicles may request to join the platoon. Vehicles that request to join the platoon are referred to as new vehicles (new with respect to participation in the platoon) or requesting vehicles. The following disclosure provides a method to arrange platooning vehicles based on the participating vehicles' and requesting vehicles' historic wireless performance scores.

Whenever a requesting vehicle requests to join the platoon, the requesting vehicle's historic ADAS score and historic wireless performance score are used to determine whether the requesting vehicle is qualified to join the platoon. If it is determined that the requesting vehicle is qualified, the lead vehicle assigns a slot position within the platoon for the requesting vehicle to join. Instructions are then transmitted to the participating follow vehicles to provide an opening in the designated slot position and instructions are communicated to the requesting vehicle to maneuver into the designated slot position to join the platoon.

Figure 1:
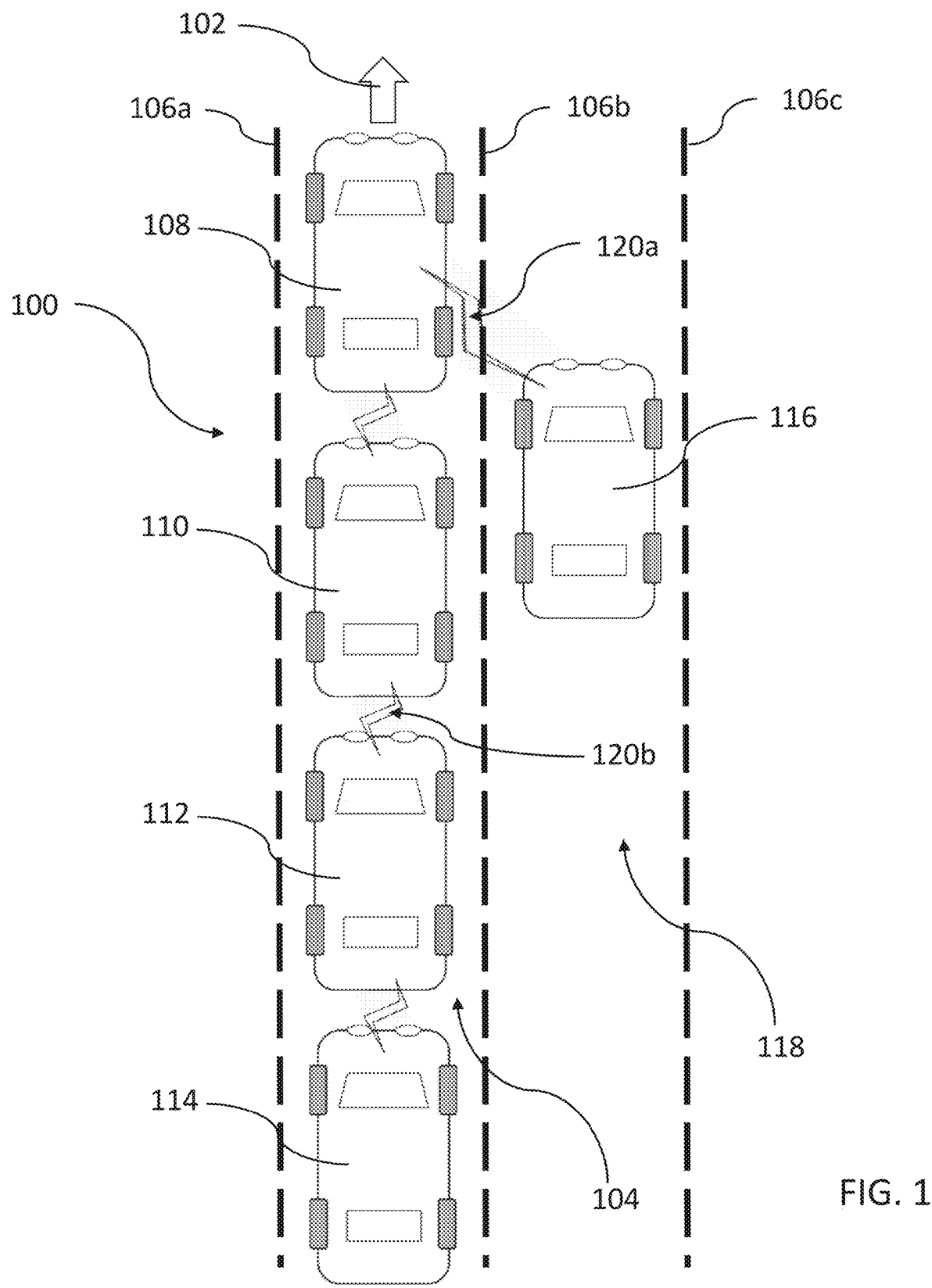
FIG. 1 is an illustration of a platoon of vehicles and a new vehicle requesting to join the platoon, according to an exemplary embodiment.

FIG. 1 shows an exemplary platoon 100 of vehicles traveling in a single file in a forward direction 102 within a travel lane 104 defined between two lane markers 106a, 106b. The platoon 100 includes a lead vehicle 108 and a plurality of follow vehicles. The follow vehicles include a potential lead vehicle 110 immediately following the lead vehicle 108, an intermediate vehicle 112 following the potential lead vehicle 110, and an end vehicle 114 following the intermediate vehicle 112. While one intermediate follow vehicle is shown, it is appreciated that there may be more than one intermediate vehicles 112 positioned between the potential lead vehicle 110 and the end vehicle 114. It is also appreciated that the exemplary platoon 100 may include only the lead vehicle 108 and the potential lead vehicle 110, in which case the potential lead vehicle 110 is also the end vehicle 114. During the course of platooning, the follow vehicles may elect to leave the platoon 100 and new vehicles 116 may request to join the platoon 100.

The new vehicle 116, also referred to as a requesting vehicle 116, is shown traveling in the same direction in a lane 118, defined between lane markers 106b and 106c, adjacent to the platoon 100. The requesting vehicle 116 is shown communicating with the lead vehicle 108 by way of wireless vehicle to vehicle (V2V) communication 120a to request joining the platoon 100. The platooning vehicles may also communication with each other using wireless V2V communications 120b. The platooning vehicles and requesting vehicle 116 may include any passenger or commercial automobile such as a car, a truck, a sport utility vehicle, a crossover vehicle, a van, a minivan, a taxi, a bus, motorcycle, etc.

Each of the platooning vehicles and the requesting vehicle 116 is equipped with an advance driver assisted system (ADAS) that is configured to operate the vehicle in partial to full autonomous mode. The terms "driver" and "operator" describe the person responsible for directing operation of the vehicle, whether actively involved in controlling one or more vehicle functions or directing autonomous vehicle operation. An ADAS configured for partial or full autonomous operating mode is also referred to as autonomous driving system (ADS). For the purpose of this disclosure ADAS and ADS are used interchangeably.

In an exemplary embodiment, the lead vehicle 108 wirelessly communicates with the follow vehicles by way of vehicle-to-vehicle (V2V) communications that transmits and receive vehicle commands, instructions, and data using Dedicated Short-Range Communications (DSRC). The lead vehicle 108 controls the speed and direction of the platoon 100. The follow vehicles respond to the lead vehicle's 108 movement by precisely matching steering, braking, and acceleration of the lead vehicle 108 in the same direction of travel. The lead vehicle 108 may be controlled by a human operator, partially assisted by the ADAS, or fully autonomous controlled by the ADAS. The follow vehicles in the platoon 100 may operate in a partially autonomous mode or full autonomous mode to follow the lead vehicle 108.

Figure 2:
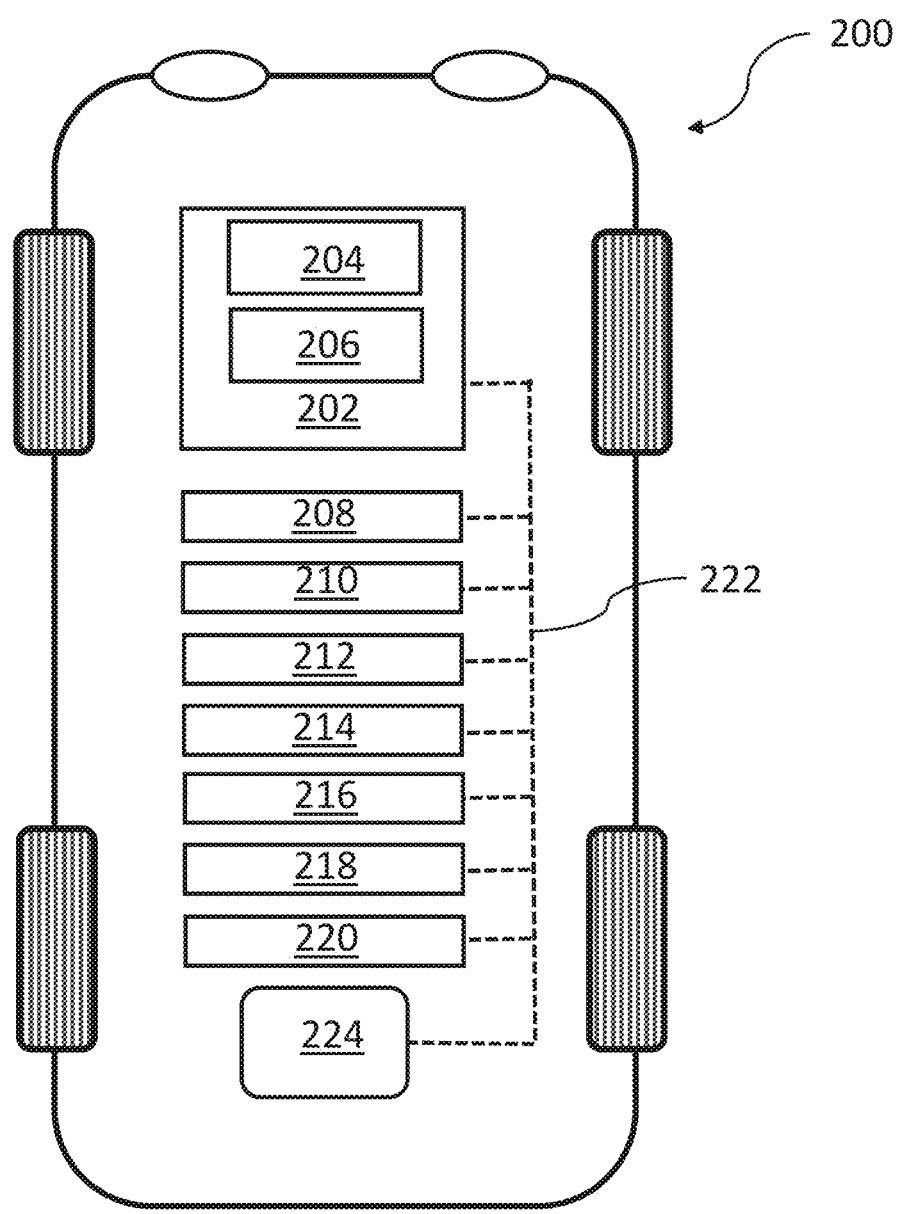
FIG. 2 is a functional diagram of a vehicle equipped having an advance driver assisted system (ADAS) and a vehicle-to-vehicle (V2V) communications system, according to an exemplary embodiment.

FIG. 2 also shows an ADAS equipped vehicle 200 having wireless communications in accordance with one aspect of the disclosure. The ADAS is capable of providing a level of driving automation from partial autonomous mode to full autonomous mode. Driving automation can include a range of dynamic driving and vehicle operation including some level of automatic control or intervention related to simultaneous automatic control of multiple vehicle functions, such as steering, acceleration, and braking, with the driver having overall control of the vehicle. Driving automation can also include simultaneous automatic control of all vehicle driving functions, including steering, acceleration, and braking, wherein the driver cedes control of the vehicle for a period of time during a trip.

The ADAS includes a computing device 202, also referred to as a controller 202, configured to communicate with various systems of the vehicle and other similarly equipped vehicles. The computing device may include containing one or more processors 204, non-transitory memory 206 and other components typically present in controllers. The non-transitory memory 206 stores information accessible by the one or more processors 204, including instructions and data that may be executed or otherwise used by the processor 204. The memory 206 may be of any type capable of storing information accessible by the processor 204, including a computing device-readable medium, or other medium that stores data that may be read with the aid of an electronic device, such as a hard-drive, memory card, ROM, RAM, DVD or other optical disks, as well as other write-capable and read-only memories. While only one computing device 202 is shown, the vehicle 200 may have multiple computing devices 202. Each of the computing devices 202 may contain one or more processors 204, memory 206 and other components typically present in computing devices 202. Each computing device 202 may control one or more system, and one system may be control by multiple computing devices 202. For the purpose of this disclosure, the one or more computing devices 202 will be referred to in the collective as the computing device 202 or the controller 202.

The computing device 202 may be in communication with various systems of vehicle, such as deceleration system 208, acceleration system 210, steering system 212, signaling system 214, navigation system 216, positioning system 218, detection system 220, and other systems in order to control the movement, speed, etc. of vehicle 200 in accordance with the instructions of memory 206 executed by the processor 204. Although these systems are shown as external to computing device 202, in actuality, these systems may also be incorporated into computing device 202, again as a partially or fully autonomous driving computing system for controlling the vehicle 200.

The detection system 220 may include one or more optical sensors (not shown) such as laser devices for having 360 degree or narrower fields of view and one or more camera devices. The detection system 220 may also include one or more range sensors (not shown) such as radar and sonar devices. Each of these radar, camera, and lasers devices may be associated with processing components which process data from these devices as part of the detection system 220 and provide sensor data to the computing device 202.

Communication between the one or more computing devices, vehicle systems, and sensors may be accomplished using a direct wired point-to-point link, a networked communication bus link, a wireless link or another suitable communication link 222. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

As an example, the computing device 202 may interact with the deceleration system 208 and acceleration system 210 in order to control the speed of the vehicle. Similarly, the steering system 212 may be used by computer device 202 in order to control the direction of vehicle. The steering system 212 may include components to control the angle of wheels to turn the vehicle 200. The signaling system 214 may be used by computing device 202 in order to signal the vehicle's intent to other drivers or vehicles, for example, by lighting turn signals or brake lights when needed.

The vehicle 200 may include a vehicle-to-everything (V2X) transceiver 224 or a vehicle-to-vehicle (V2V) transceiver 224 having a circuit configured to use Wi-Fi and/or Dedicated Short Range Communications (DSRC) protocol for communication with other vehicles equipped with similar communication systems and to roadside units equipped with V2X communications to receive information such as lane closures, construction-related lane shifts, debris in the roadway, and stalled vehicles.

Figure 3:
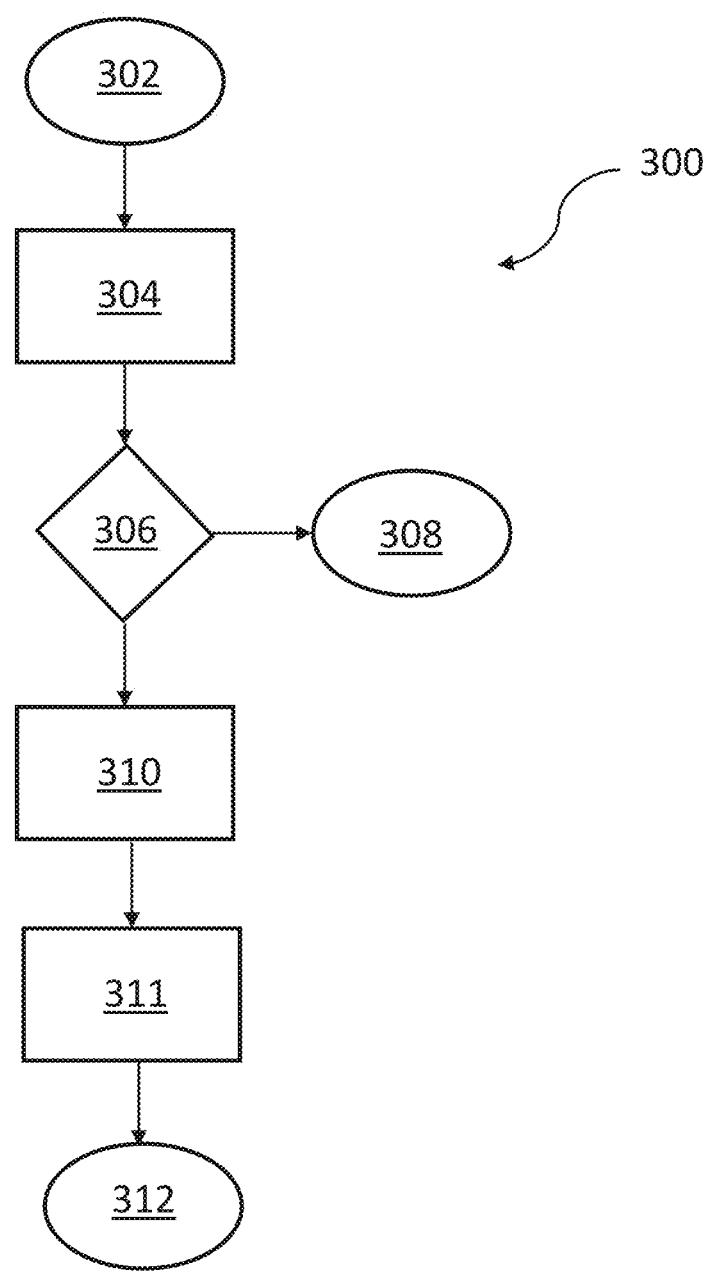
FIG. 3 is a block flowchart of a high level overview of a method of arranging platooning vehicles based on the vehicles' historic wireless performance, according to an exemplary embodiment.

FIG. 3 presents a block flowchart of a high level overview of a method of arranging platooning vehicles based on the vehicles' historic wireless performance (herein referred to as "method 300"). The method 300 may be stored in and implemented by the computing devices 202 of the platooning vehicles, preferably the lead vehicle 108, and requesting vehicle 116. The method begins in block 302 when a requesting vehicle 116 initiates communications with the lead vehicle 108 of a group of platooning vehicles to requests permission to join the platoon. Moving to block 304, the lead vehicle 108 analyzes the last 5 ADAS instance state-of-health (SOH) scores of the requesting vehicle 116 to determine if the requesting vehicle 116 meets a predetermined minimal threshold to join the platoon. The last 5 ADAS SOH scores are based on the requesting vehicle's last 5 ADAS activations, preferably during a platooning event. US Patent Publication No. US20190066406A1 filed by GM Global Technology Operations LLC, which is incorporated herein in its entirety, teaches a method for monitoring the SOH for a plurality of components and systems in an ADAS equipped vehicle and providing a SOH score.

Moving to block 306, if the last 5 ADAS instance SOH score of the requesting vehicle 116 does not meet the minimal threshold level to join the platoon, then the method moves to block 308 where the lead vehicle 108 denies permission for the requesting vehicle 116 to join the platoon and the method 300 ends. Referring back to block 306, if the last 5 ADAS instance SOH score of the requesting vehicle 116 meets or exceeds the minimal threshold level to join the platoon, then the method proceeds to block 310.

Moving to block 310, the lead vehicle 108 then analyzes the historic ADAS SOH scores of the requesting vehicle 116 to determine if there were any discrepancies. Moving to block 311, the lead vehicle 108 then request historic wireless performance data from the requesting vehicle 116 and analyzes the historic wireless data using a wireless performance score matrix to calculate an overall wireless performance score.

Moving to block 312, based on the historic ADAS SOH scores and the calculated Overall Wireless Performance (WP) Score of the request vehicle 116, the lead vehicle 108 designates a slot position within the platoon for the requesting vehicle 116 to join the platoon. The lead vehicle 108 then communicates with the follow vehicles to open up the slot position and instructs the requesting vehicle 116 to maneuver into the open slot position. The method 300 then ends.

Figure 4A:
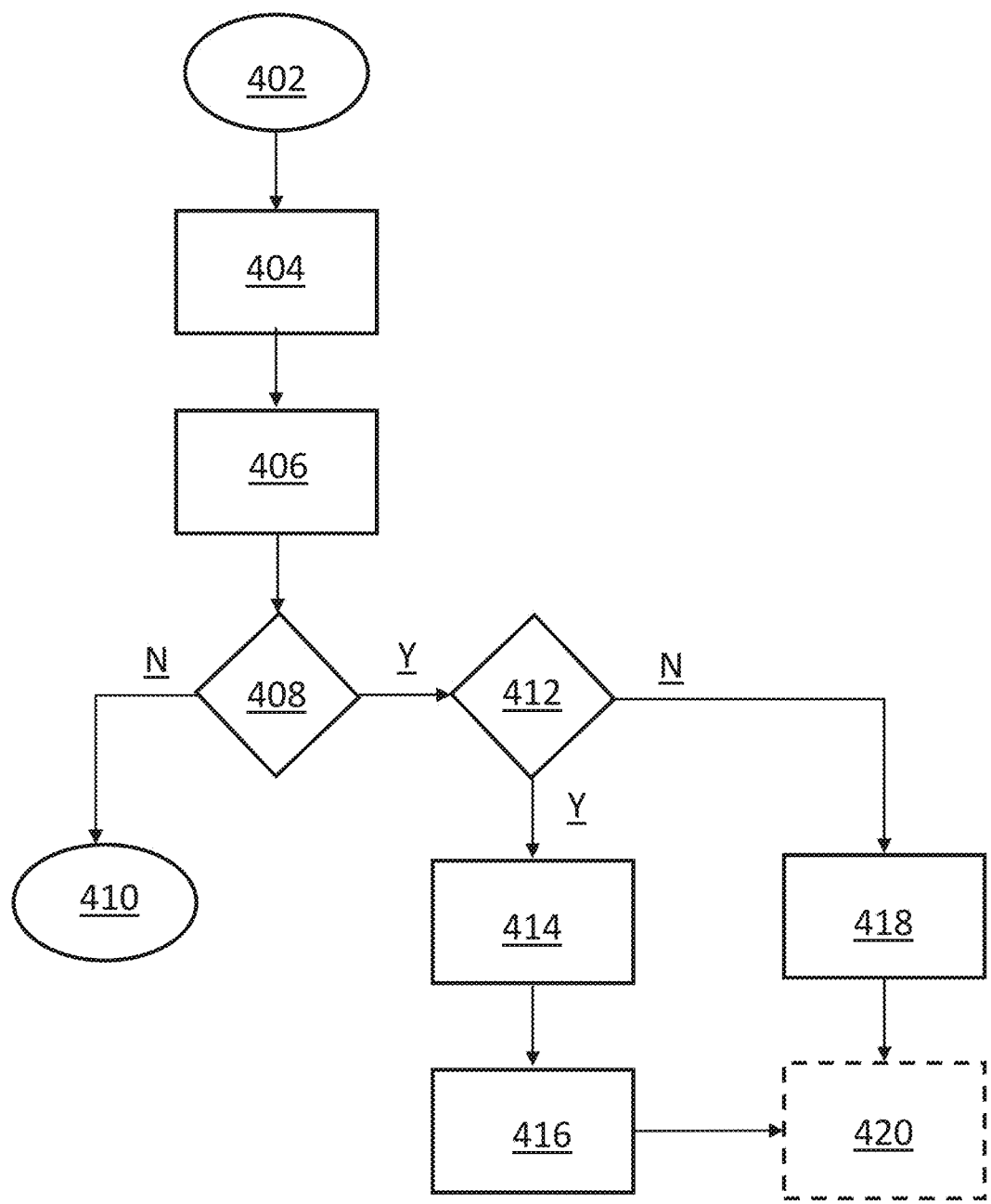
FIG. 4A is block flowchart of the method of arranging platooning vehicles based on the vehicles' historic wireless performance, according to an exemplary embodiment.

FIGS. 4 and 5 presents a block flowchart of a detailed level explanation of the Method 300. First referring to FIG. 4, starting in block 402 a requesting vehicle 116 approaches a group of platooning vehicles and transmits to the lead vehicle 108 a request to join the platoon 100. Moving to block 404, the lead vehicle 108 replies to the requesting vehicle 116 by requesting the ADAS data for each of the last 5 instances when the ADAS was activated, preferably when the requesting vehicle participated was in a platoon, as well as the overall historic ADAS data of the requesting vehicle 116. The requesting vehicle 116 complies by transmitting the same to the lead vehicle 108. The last 5 instances means the most recent 5 instances that the ADAS was activated, preferably while platooning. The overall historic ADAS data means the ADAS data over the operating life of the vehicle.

Moving to block 406, the lead vehicle 108 processes the historic ADAS data of the requesting vehicle 116 and assigns an Overall Historic ADAS SOH Score to the requesting vehicle 116. The lead vehicle 108 then analyzes the data of the last 5 ADAS instances and assigns an ADAS Instance SOH Score for each of the last 5 ADAS instances. Alternatively, the last 5 ADAS Instance SOH Scores and the Overall Historic ADAS SOH Score may be computed and provided by the requesting vehicle 116 to the lead vehicle 108. The Overall Historic ADAS SOH Score and the last 5 ADAS Instance SOH Score may be in the format of color codes such as Green, Yellow, and Red. Green indicating that the ADAS is operating within specification, Yellow indicating a possible deviation in the ADAS, and Red indicating a possible fault in the ADAS. Alternatively, the ADAS scores may be that of a numeric value, where the higher numeric value indicates that the ADAS is operating within specification and a lower valve indicates that the ADAS may have a possible deviation or fault.

Moving to block 408, the lead vehicle 108 determines if all of the last 5 ADAS Instance SOH Scores are above a minimal instance threshold level. If one or more of the last 5 ADAS Instance SOH Scores is below the threshold level, then the method 300 moves to block 410 where the lead vehicle 108 denies permission for the requesting vehicle 116 to join the platoon 100 and the method 300 ends. If all of the last 5 ADAS Instance SOH Scores are at or above the threshold level, then the method moves to block 412.

In block 412, the lead vehicle 108 analyzes the Overall Historic ADAS SOH Score to determine if there were any discrepancies, such as falling below a predetermined ADAS threshold for a period of time. If there are discrepancies detected, then the method moves to block 414 where the lead vehicle 108 assign a yellow flag status to the requesting vehicle 116. From block 414, the method moves to block 416 where the lead vehicle 108 assigns the requesting vehicle 116 to the end of the platoon and monitors the requesting vehicle's 116 Dynamic ADAS SOH Scores (i.e. the instant or real-time ADAS SOH scores) and the method moves to block 420, which is continued in FIG. 5. Referring back to block 412, if there are no discrepancies detected in the Overall Historic ADAS SOH Score, then the method moves to block 418 where the lead vehicle 108 assigns a green flag status to the requesting vehicle 116 and the method moves to block 420, which is continued in FIG. 4B.

Figure 4B:
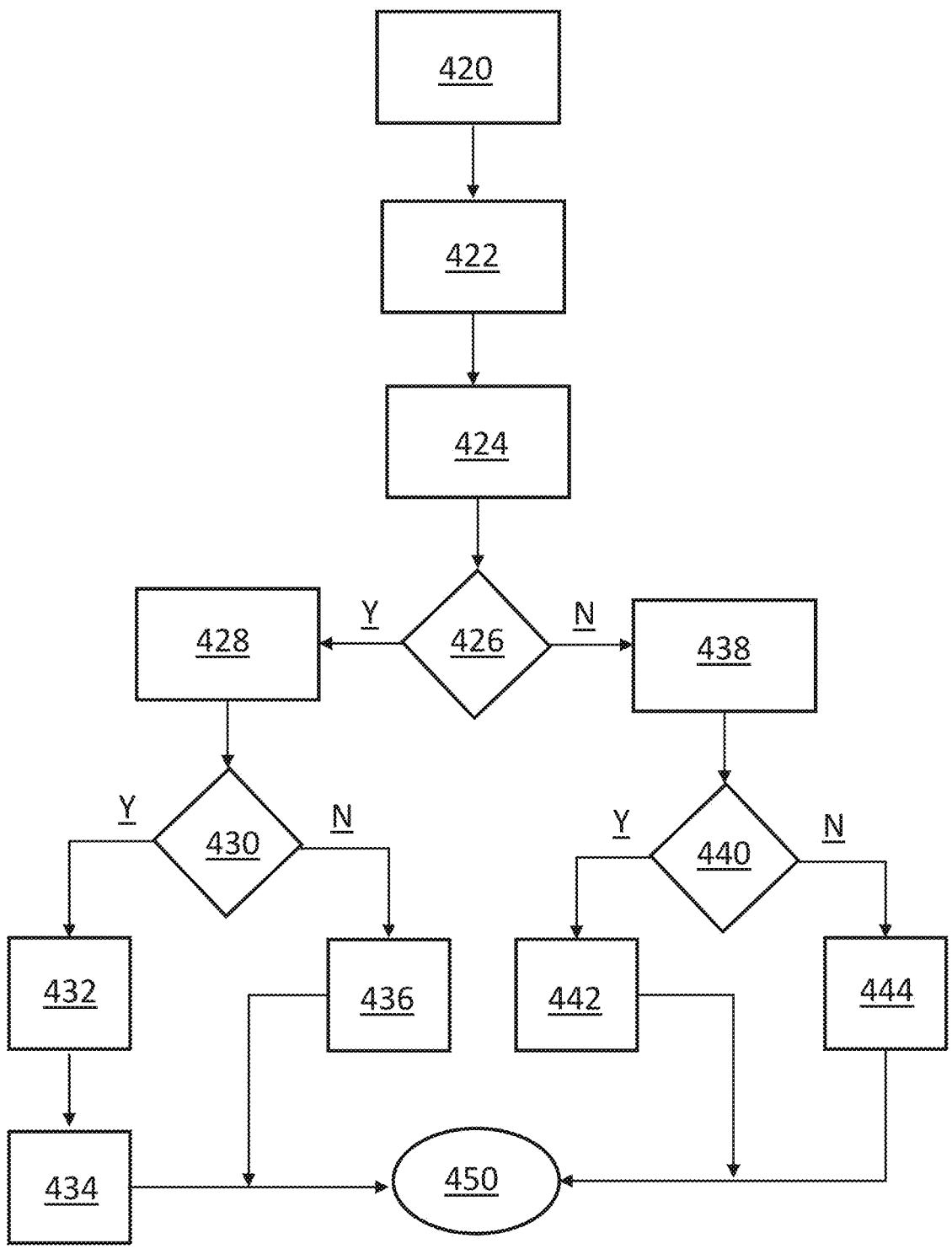
FIG. 4B is a continuation of the block flowchart of FIG. 4A.

Moving to block 420 in FIG. 4B, the lead vehicle 108 requests the historic wireless performance data and other vehicle information that is applicable in calculating a Wireless Performance (WP) Score for the requesting vehicle's 116. The requesting vehicle 116 complies by transmitting the same to the lead vehicle 108.

Moving to block 422, the lead vehicle 108 transmits the requesting vehicle's historic wireless performance data and vehicle information to the participating vehicles in the platoon 100. Moving to block 424, the lead vehicle 108 runs the requesting vehicle's historic wireless performance data and vehicle information through a wireless performance scoring matrix, which is disclosed in detail below and shown in FIG. 5, to determine an overall WP Score for the requesting vehicle 116. The overall WP Score may be that of a numeric value, where the higher numeric value indicates the V2V communications system is operating within specification and a lower valve indicates the V2V communications system may have a possible fault.

Moving to block 426, the lead vehicle 108 determines if the WP Score of the requesting vehicle 116 is greater than or equal to a predetermined minimum wireless performance threshold. If the WP Score is greater than or equal to the predetermined minimum wireless performance threshold, then the method moves to block 428. In block 428, the lead vehicle 108 compares the WP Score of the requesting vehicle 116 with the WP Scores of all the follow vehicles.

From block 428 moving to block 430, the lead vehicle 108 compares the WP Score of the requesting vehicle 116 to the WP Score of the potential lead vehicle (PLV) 110, which is the second vehicle in the platoon 100 immediately behind the lead vehicle 108. If the WP Score of the requesting vehicle 116 is equal to or less than the WP Score of the PLV 110, then the method moves to block 432 where the lead vehicle 108 assigns a slot position, also referred to as a "follow vehicle order number", for the requesting vehicle 116 behind the PLV 110. The slot position assigned to the requesting vehicle 116 is based on the relative WP Score of the requesting vehicle 116 as compared to the WP Scores of the follow vehicles behind the PLV 110. The slot positions are assigned in order of WP Scores, where the higher WP Scores (Green) are positioned toward the front and the lower WP Scores (Yellow) are positioned toward the back platoon. For vehicles having equal WP Scores, the vehicle with the higher Overall Historic ADAS SOH Score or the higher last 5 ADAS Instance SOH Scores are positioned toward the front of the platoon.

Moving to block 434, the lead vehicle 108 sends join instructions to the requesting vehicle 116 and participating vehicles. Moving to block 450 from block 434, the participating vehicles opens space in the designated slot position and the requesting vehicle 116 maneuvers into the assigned slot position.

Referring back to block 430, if the requesting vehicle 116 WP Score is not less than or equal to (i.e. it is greater than) the PLV 110 score, then the method moves to block 436. In block 436, the lead vehicle 108 assigns a slot position between the PLV 110 and the lead vehicle 108 and designate the requesting vehicle 116 as the new PLV, thereby replacing the participating PLV 110 to be the new PLV. The lead vehicle 108 send join instructions to the requesting vehicle 116 and participating vehicles.

Moving to block 450 from block 436, the participating vehicles opens space in the designated slot position and the requesting vehicle 116 maneuvers into the assigned slot position behind the lead vehicle 108 and in front of the prior PLV 110.

Referring back to block 426, if the WP Score is not greater than or equal to (i.e. less than) the predetermined minimum wireless performance threshold, then the method moves to block 438. In block 438, the lead vehicle 108 compares the WP Score of the requesting vehicle 116 with the WP Scores of all the participating follow platooning vehicles.

From block 438 moving to block 440, the lead vehicle 108 compares the WP Score of the requesting vehicle 116 with the WP Scores of the follow vehicles to determine if the WP Score of the requesting vehicle 116 is less than all the follow vehicles. If the WP Score of the requesting vehicle 116 is less than the WP Scores of all the follow vehicles, then the method moves to block 442 where the lead vehicle 108 assigns a slot position behind the last vehicle in the platoon 100 for the requesting vehicle 116.

Moving to block 450 from block 442, the requesting vehicle 116 maneuvers into the assigned slot position as the end vehicle.

Referring back to block 440, if the WP Score of the lead vehicle 108 is not less than the WP Score of all the follow vehicles, then the method moves to block 444 where the lead vehicle 108 transmit a "join with vehicle order number" to the follow vehicles and request the joining vehicle 116 to send dynamic wireless metrics after joining the platoon. The vehicle order number, or designated slot position, is determined based on the ranking of the follow vehicles' WP Scores.

Moving to block 450 from block 444, the participating vehicles opens space in the designated slot position and the requesting vehicle 116 maneuvers into the assigned slot position.

FIG. 5 shows an example of a wireless performance score matrix 500 used by the lead vehicle 108 to evaluate and provide a WP Score of the requesting vehicle 116. The wireless performance score matrix 500 includes 4 columns, where column A shows examples of the vehicle information, or criteria, of the wireless system being evaluated. In this particular example, the criterial include: Number of Platooning Engagements, Time Duration in Platooning Engagements, RSSI*, Packet Delivery Ratio*, Signal to Interference Noise Ratio*, Bit Error Rate*, and Latency*. The criteria indicate with an asterisk (*) are weighted, where the higher weighted value represents the higher the importance of the criteria.

Column B shows the number of instances or engagements of the requesting vehicle 116 participated in a platoon or when the ADAS was activated. Column C shows the number of instances that the SOH of criteria in column A have been above the threshold minimum value shown in Column C, which based on based on 3GPP current Radio access technology.

The lead vehicle 108 receives the vehicle information from the requesting vehicle 116 and utilizes the wireless performance score matrix 500 to compute an Overall WP Score for the requesting vehicle 108. The lead vehicle 108 already has the WP Scores for the follow vehicles in the platoon, since each follow vehicle was also a request vehicle before joining the platoon. The lead vehicle compares the WP Score of the requesting vehicle 116 with WP Scores of those of the follow vehicles for the arranging of the requesting vehicle in the platoon 100. In this particular example, the higher numeric WP Score represent a V2V communications system that is operating more consistently within specifications.

As an example, the following formulas is used to calculate a WP Score for each criterial (column A):

$$\text{Criteria Wireless Performance Score} = (NI/TI)*Wt$$

Where:
NI=Number of Instances above Threshold (Column C);
TI=Total number of instances (see Column B); and
Wt=Weight assigned to a criteria (see Column F on FIG. 6).

A vehicle WP Score for the requesting vehicle 116, also referred to as the overall WP Score, is the sum of the Criteria Wireless Performance Scores.

FIG. 6 shows an example of a ranking of the WP Score of the requesting vehicle as compared to the WP Scores of the participating vehicles in the platoon.

Column E lists the same criteria as that of Column A of FIG. 5. Column F shows the weights assigned to each of the criteria in Column E. Column G shows the calculated Criteria Wireless Performance Score for the requesting vehicle 116. Columns H-K show the calculated Criteria Wireless Performance Score for the participating vehicles 1 through N in the platoon. The vehicle WP Score, which is the total of the Criteria Wireless Performance Score, is shown in Row L for each of the vehicles. In this particular example, the higher vehicle WP Score represents the better health of the vehicles V2V communications system.

Based on the example shown in FIG. 6, the requesting vehicle having a vehicle WP Score of 13.15 will be assigned a slot position between Vehicle 1 and Vehicle 2, which has a vehicle WP Score of 15.25 and 13.1 respectively.

While example embodiments are shown for systems and methods, also alternative ways may be envisaged by those skilled in the art having the benefit of the present disclosure for achieving a similar function and result. Some components and method steps may be combined or split up into one or more alternative components or method steps. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of arranging a requesting vehicle in a platoon, comprising:
    receiving a request to join the platoon from a requesting vehicle;
    requesting and receiving a historic Advance Driver Assisted System (ADAS) data from requesting vehicle;
    analyzing the historic ADAS data to determine a plurality of last ADAS Instance SHO Scores;
    determining if the plurality of last ADAS Instance State-of-Health (SHO) Scores are above a minimal ADAS Instance SHO threshold; and
    denying requesting vehicle permission to join the platoon, when at least one of the plurality of last ADAS Instance SHO Scores are not above the minimal ADAS Instance SHO threshold.

2. The method of claim 1, further comprising:
    analyzing the historic ADAS data to determine an Overall Historic ADAS SOH Score;
    determining if the Overall Historic ADAS SOH Score includes a discrepancy, when the plurality of last ADAS Instance SHO Scores are above the minimal ADAS Instance SHO threshold; and
    arranging the requesting vehicle to an end position in the platoon, when the Overall Historic ADAS SOH Score includes the discrepancy.

3. The method of claim 2, further comprising:
    requesting and receiving a historic wireless performance data from the requesting vehicle and analyzing the wireless performance data to determine an Overall Wireless Performance (WP) Score of the requesting vehicle, when the Overall Historic ADAS SOH Score does not include the discrepancy;
    determining whether the Overall WP Score of the requesting vehicle is equal to or greater than a minimum wireless performance threshold;
    determining if the Overall WP Score of the requesting vehicle is equal to or less than a WP Score of a potential lead vehicle (PLV), when the Overall WP Score of the requesting vehicle is equal to or greater than a minimum wireless performance threshold; and arranging the requesting vehicle to a position behind the PLV, when the Overall WP Score of the requesting vehicle is equal to or less than the WP Score of the PLV the WP Score of the potential lead vehicle (PLV).

4. The method of claim 3, further comprising:
arranging the requesting vehicle to a position in front of the PLV and designate the requesting vehicle as a new PLV, when the Overall WP Score is of the requesting vehicle is greater than the WP Score of the PLV.

5. The method of claim 3, further comprising:
determining if the Overall WP Score is less than all the WP Scores of a plurality of follow vehicles, when the Overall WP Score of the requesting vehicle is less than the minimum wireless performance threshold;
arranging the requesting vehicle in an end position of the platoon, when the Overall WP Score of the requesting vehicle is less than all the WP Scores of the plurality of follow vehicles.

6. The method of claim 5, further comprising arranging the requesting vehicle and the follow vehicles in order from high to low WP Scores with the higher WP Scores toward a front of the platoon, when the Overall WP Score of the requesting vehicle is greater than all the WP Scores of the plurality of follow vehicles.

7. The method of claim 5, when the requesting vehicle and the one of the follow vehicles have an equal WP Score, the requesting vehicle and the one of the follow vehicles having a higher Overall Historic ADAS SOH Score is arranged in front of the other of the requesting vehicle and the one of the follow vehicles.

8. The method of claim 2, wherein the analyzing wireless performance data to determine the Overall WP Score includes:
determining a Weighted Criteria WP Score of each of a plurality of wireless criteria; and
calculating the Overall WP Score by summing the Weighted Criteria WP Scores.

9. The method of claim 8, wherein the Weighted Criteria WP Score is calculated by:

Weighted Criteria WP Score=(NI/TI)*Wt

Where:
NI=Number of Instances above a criteria threshold;
TI=Total number of instances of past platoon engagement; and
Wt=Weight assigned to a criteria, wherein the greater a numerical valve, the greater the importance of the criteria.

10. The method of claim 1, wherein a lead vehicle of the platoon is performing the method of claim 1.

11. A method of arranging platooning vehicles, comprising:
requesting, by a requesting vehicle, to join a platoon having a plurality of participating vehicles, wherein each of the plurality of participating vehicle includes an Advance Driver Assisted System (ADAS) State-of-Health (SOH) Score and a Wireless Performance (WP) Score;
determining an ADAS SOH Score of the requesting vehicle;
determining if the ADAS SOH Score of the requesting vehicle meets a minimal ADAS threshold;
determining a WP Score of the requesting vehicle when the ADAS SOH score of the requesting vehicle meets the minimal ADAS threshold; and
assigning a slot position within the platoon to the requesting vehicle based on a comparison of at least one of: (i) the ADAS SOH Score of the requesting vehicle and the ADAS SOH Scores participating vehicles, and (ii) the WP Score of the requesting vehicle and the WP Scores of the participating vehicles.

12. The method of claim 11, wherein determining if the ADAS SOH score of the requesting vehicle meets a predetermine threshold includes:
determining if a plurality of last ADAS Instance SOH Scores of the requesting vehicle meet a predetermined minimal ADAS Instance SHO threshold; and
rejecting the requesting vehicle, when the plurality of last ADAS Instance SOH Scores of the requesting vehicle does NOT meet the predetermined minimal ADAS Instance SHO threshold.

13. The method of claim 12, further comprising:
determining if an Overall Historic ADAS SOH Score of the requesting vehicle includes a discrepancy, when the plurality of last ADAS Instance SOH Scores of the requesting vehicle DOES meet the predetermined minimal ADAS Instance SHO threshold; and
assigning an end position within the platoon for the requesting vehicle, when the Overall Historic ADAS SOH Score of the requesting vehicle DOES includes a discrepancy.

14. The method of claim 12, wherein the plurality of participating vehicles includes a lead vehicle and a potential lead vehicle (PLV) immediately behind the lead vehicle, and further comprising:
determining if the WP Score of the requesting vehicle is equal to or greater than a predetermined wireless performance threshold, when the Overall Historic ADAS SOH Score of the requesting vehicle does NOT includes a discrepancy;
determining if the WP Score of the requesting vehicle is equal to or less than the WP Score of the PLV, when the WP Score of the requesting vehicle is equal to or greater than the predetermined wireless performance threshold;
assigning the requesting vehicle as a new PLV vehicle behind the lead vehicle, when the WP Score of the requesting vehicle is NOT equal to or is less than the WP Score of the PLV.

15. The method of claim 14, further comprising:
determining if the WP Score of the requesting vehicle is less than all the WP Scores of the participating vehicles, when the WP Score of the requesting vehicle is NOT equal to or greater than the predetermined wireless performance threshold; and
assigning an end position for the requesting vehicle, when the WP Score of the requesting vehicle is less than all the WP Scores of the participating vehicles.

16. A method of arranging platooning vehicles based on the vehicles' historic wireless performance, comprising:
requesting permission, by a requesting vehicle, from a platooning vehicle to join a platoon;
requesting and receiving, by the platooning vehicle, a predetermined number of Advance Driver Assisted System (ADAS) Instance State-of-Health (SOH) Scores from the requesting vehicle;
determining, by the platooning vehicle, if the predetermined number ADAS Instance SOH Scores are above a predetermined minimal ADAS Instance SHO threshold; and
denying permission, by the platooning vehicle, for the requesting vehicle to join when the predetermined number ADAS Instance SOH Scores are NOT above the predetermined minimal ADAS Instance SHO threshold.

17. The method of claim 16, further comprising:

requesting and receiving, by the platooning vehicle, an Overall Historic ADAS SOH Score from the requesting vehicle;

determining, by the platooning vehicle, if the Overall Historic ADAS SOH Score contains one or more discrepancies; and assigning, by the platooning vehicle, the requesting vehicle to the end of the platoon when the Overall Historic ADAS SOH Score contains one or more discrepancies.

18. The method of claim 17, further comprising:

requesting and receiving, by the platooning vehicle, a Historic Wireless Performance Data from the requesting vehicle;

determining, by the platooning vehicle, an Overall Wireless Performance Score from the Historic Wireless Performance Data from the requesting vehicle;

comparing and ranking the Overall WP Score of the requesting vehicle with an Overall WP Score of each of the platooning vehicles; and assigning a slot position, by the platooning vehicle, for the requesting vehicle base on the ranking of the Overall WP Score of the requesting vehicle.

19. The method of claim 16, wherein the platooning vehicle is a lead vehicle.

20. The method of claim 16, where predetermined number of last ADAS Instance SOH Scores is last 5 ADAS Instance SOH Scores.

* * * * *